W. & D. ASCH.
ELECTRIC DENTAL HEATER.
APPLICATION FILED DEC. 22, 1910.
1,009,008.
Patented Nov. 14, 1911.
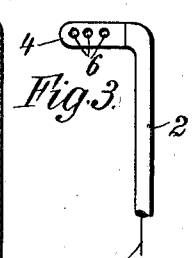
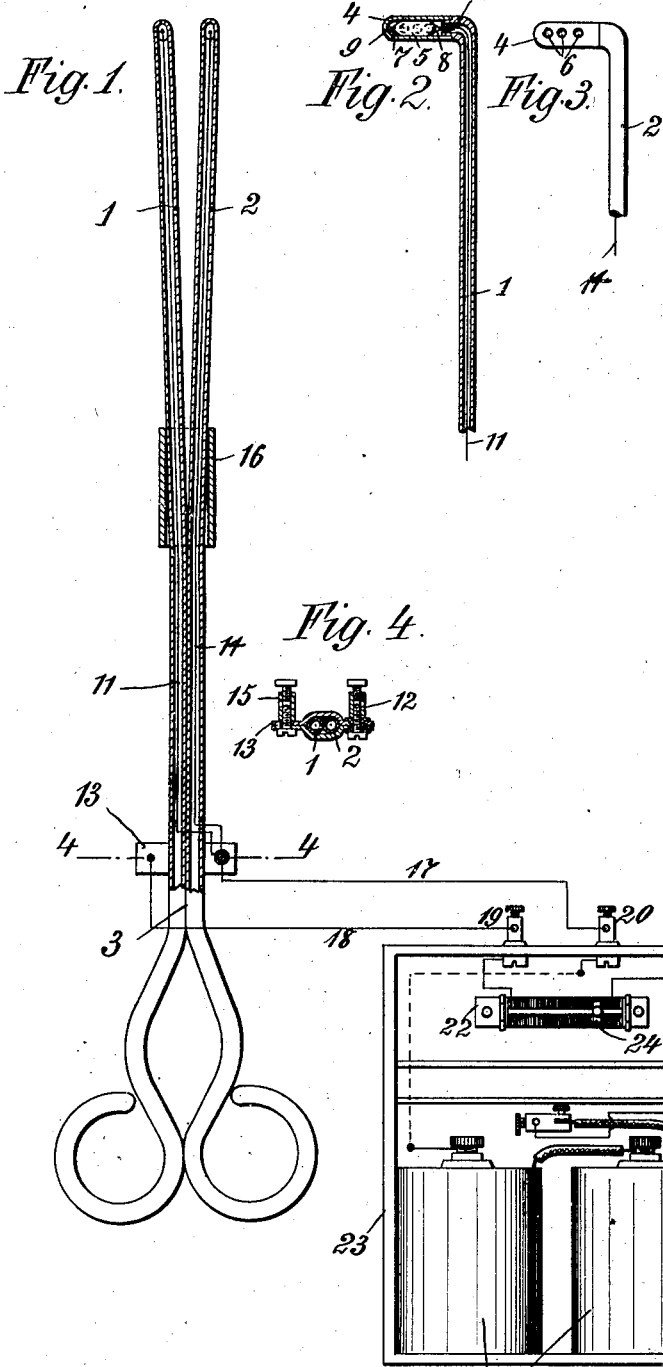
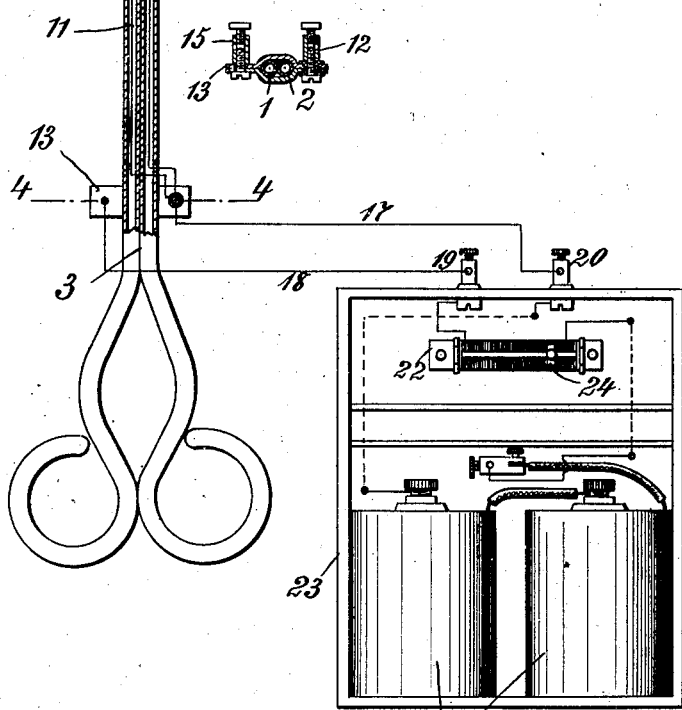
WITNESSES
W. P. Burk
John C. Sanders
INVENTORS
Wladislaw Asch
Dagobert Asch
BY Wm Wallace White
ATT'Y

UNITED STATES PATENT OFFICE.

WLADISLAW ASCH AND DAGOBERT ASCH, OF BERLIN, GERMANY.

ELECTRIC DENTAL HEATER.

1,009,008.　　　　　　　　Specification of Letters Patent.　　Patented Nov. 14, 1911.

Application filed December 22, 1910. Serial No. 598,790.

*To all whom it may concern:*

Be it known that we, WLADISLAW ASCH and DAGOBERT ASCH, subjects of the German Emperor, residing at Berlin, Germany, have invented new and useful Improvements in Electric Dental Heaters, of which the following is a specification.

In many industrial branches cementlike materials are employed in large quantities, so for maritime and ordinary building purposes and also in manufacturing artistic products. For a number of years cements have been used in dentistry for filling up cavities in teeth. The cements used for the latter purpose are distinguished as dental cements which are non-transparent, and dental cements which have a transparent gloss and thereby resemble the natural enamel of the teeth.

The length of time required by cements to harden is different. The finer grained the cement powder, the quicker it will set; the contents of liquid matter in the cement compound plays a further important part in this respect. So for instance with dental cements, with which solutions of acids and salts are employed, the latter must be more or less diluted or concentrated accordingly as rapid or slowly setting cements are to be used. In most cases a cement compound will be desirable, with which the setting process commences slowly, so that the mixed cement may be given the desired shape or form. When then the block of cement has been prepared, it should pass as quickly as possible through the various setting phases. In dentistry the conditions will be as follows: While he is preparing the filling the dentist will want the cement to set slowly; but when he has introduced the filling into the cavity in the tooth, and has given it the necessary shape, he wants the cement to set as quickly as possible, so that he may be able to grind it off soon and the setting will not be extended too long.

The object of the present invention is the solution of this problem.

The compound may be of a slowly setting character, so that it will allow of being conveniently formed into blocks, artistic articles, dental fillings, whereupon the setting process is artificially accelerated, so that the setting phases may be even more rapid than with quickly setting cements.

It is a known fact, that chemical reactions always proceed considerably quicker at higher temperatures, and also the chemical setting process is actually accelerated by heat. A cement, for instance, which will set at a temperature of 18° C., in about 15 minutes, will go through the setting phases in two to three minutes at a temperature of 37° C. Heretofore heat has never yet been employed in building for the purpose of accelerating the setting, and in dentistry only in an unsatisfactory manner by means of a hot air-blower. This has the following disadvantages. 1. Heat of a high degree is immediately applied to the filling. By the effect of the hot iron tube the cement is too quickly heated to a high temperature, so that it will crack or become very brittle. The durability of the filling is thereby impaired. 2. By means of the hot air-blower it is not possible to heat the cement continuously for any length of time as the glowing hot iron-tube of the blower will soon cool. If the filling is to be kept hot for any length of time by means of the hot air-blower, the latter will have to be repeatedly heated. 3. A rapid supply of heat, of high temperatures will almost always cause the patient pain and is almost impossible with sensitive patients. 4. A large number of the silicate cements on the market are even brittle when allowed to set under ordinary conditions and their brittleness is considerably increased by the rapid supply of heat of high degrees.

The essential feature of the present invention consists in a continuous supply of heat in such a manner, that the temperature of the source of heat rises gradually, the supply of heat being regulable, so that only heat of a given temperature may be supplied. By the gradual rise of the temperature of the continuous supply of heat it does not happen that the compound is deteriorated by cracks and fissures or by becoming brittle. By the continuous supply of heat during a given period a considerable acceleration of the setting phases of all cements on the market is obtained.

In the accompanying drawing an apparatus is exemplified, which may be used in carrying out the present method in dentistry.

Figure 1 is the apparatus in side elevation and partly in section, connected to an electric source of current. Fig. 2 is the upper end of the left leg of the tongs in longitudinal section; Fig. 3 is the upper end of the right leg in elevation. Fig. 4 is a section along the line 4—4 in Fig. 1.

The apparatus consists of a kind of tongs; the legs 1 and 2 are soldered or otherwise connected with each other at 3. The legs 1 and 2 are hollow and bent over at their free ends at right angles into parallel planes. The parts 4 thus bent over are closed at their free ends with sleeve-like members, which are secured to the ends of the legs 1 and 2 by a screw-joint. The sleeves 4 form the jaws of the tongs and serve to receive an electric glow-lamp 5. The inner sides of the jaws 4 are provided with perforations 6 to permit the rays of light to pass therethrough. The glow-lamp 5 contains a filament extending longitudinally through the same, which terminates at both ends in contacts 7 and 8, of which the one 7 is in electric connection with the sleeve 4, whereas the other is in contact with a contact piece 10 insulatedly fitted into the free end of the tubular leg. From this contact piece an electric conductor 11 leads through the hollow leg to a terminal 12, which is insulatedly fitted on a clasp 13 secured to the legs 1 and 2 close to their joint. From this terminal a second wire 14 leads through the other hollow leg to a second glow-lamp, which is arranged and fitted in a similar manner in the second jaw 4. The clasp 13 has a second terminal 15, which is conductively connected with the clasp. On the legs 1 and 2 a sleeve 16 is displaceably fitted, which serves to approach the jaws 4 to each other according to requirement. The jaws are automatically separated from each other, on the sleeve 16 being pushed back, in consequence of the elasticity of the legs.

To the terminals 12 and 15 respectively are connected conductors 17 and 18 which are connected with the terminals 19 and 20 respectively of a battery 21. This battery is arranged together with a regulable series resistance 22 in a common box receptacle 23. The series resistance 22, which is of a known type, is connected to the circuit leading to the lamps 5 of the tongs. By displacing the contact piece 24 of the series resistance the current may be varied at will and thereby the heat to be transmitted by the lamps may be gaged. In some instances the series resistances may be omitted, if desired, without in any way departing from the spirit of the invention. In place of the clasp 13 also the slide 16 may be adapted to carry the terminals. The slide may also serve to interrupt the contact of the lamp circuit. When the contact is closed, the lamps will be supplied with electric energy, which will be converted into heat and light energy, as the small electric lamps will radiate much heat in the red rays.

The device is particularly applicable for transparent cements, as the rays of light will penetrate the transparent material and provides chemical reactions which assist in the hardening process. This results in a rapid acceleration of the setting process, without the cement being in any way deteriorated.

For different cements of course different modifications of the apparatus will have to be employed. The principle of the supply of heat will, however, always remain the same: the conversion of electric energy into heat and light energy, the regulation of this heat and light energy by interpolation of resistances.

It is obvious that other source of heat, may be employed for accelerating the setting, provided the conditions are met with, that the heat is gradually increased, regulable and of continuous effect.

We claim:

1. An apparatus for hardening cement fillings in teeth, consisting of hollow tongs having teeth-engaging portions, said teeth-engaging portions being provided with apertures in their teeth-engaging surfaces communicating with the interior of the tongs, electric heating elements positioned within said tongs and adjacent said apertures whereby the electrical energy will be directed through said apertures upon the tooth which is being filled, and means for supplying an electric current to said elements.

2. An apparatus for hardening cement fillings in teeth, consisting of hollow tongs having teeth-engaging portions, said teeth-engaging portions being provided with apertures in their teeth-engaging portions communicating with the interior of the tongs, electric lamps positioned within said tongs adjacent said apertures, whereby the light from the lamps will pass through said apertures and will be directed upon the tooth which is being filled, and means for supplying an electric current to said lamps.

3. An apparatus for hardening cement fillings in teeth consisting of tongs with hollow legs, the ends of said legs bent over at angles and adapted to form hollow jaws, electric glow-lamps in said jaws, apertures in the inner sides of said jaws, conductors for an electric current in said hollow jaws and a source of current connected to said conductors.

4. An apparatus for hardening cement fillings in teeth consisting of tongs, with hollow legs, the ends of said legs bent over at right angles and adapted to form hollow jaws, electric glow-lamps in said jaws, apertures in the inner sides of said jaws, conductors for an electric current in said hollow jaws, terminals connected to said conductors, a source of electricity, connecting conductors between the source of electricity and the said terminals and a regulable resistance in series with said connecting conductors.

5. An apparatus for hardening cement fillings in teeth consisting of tongs, with hollow legs, the ends of said legs bent over at right angles and adapted to form hollow jaws, said jaws unscrewable and having a plurality of apertures in the inner sides, electric glow-lamps loosely fitted in said hollow jaws, contact pieces on both ends of said glow-lamps, some of said contact pieces bearing against the walls of said jaws, others bearing against contact pieces insulatedly fitted in said hollow legs, a clasp with two terminals fitted on the tongs, one of said terminals being insulated from said clasp, two electric conductors in said hollow legs conducted at their one ends with said contact pieces, at their other ends with the said insulated terminal, a slide displaceably fitted on the legs of the tongs adapted to approach these to each other when displaced and means of supplying an electric current to said terminals.

In testimony whereof we have signed our names to this specification in the presence of two subscribing witnesses.

WLADISLAW ASCH.
DAGOBERT ASCH.

Witnesses:
WOLDEMAR HAUPT,
HENRY HASPER.